No. 700,490. Patented May 20, 1902.
F. HEINZ.
TIRE TIGHTENER.
(Application filed Jan. 28, 1901.)
(No Model.)
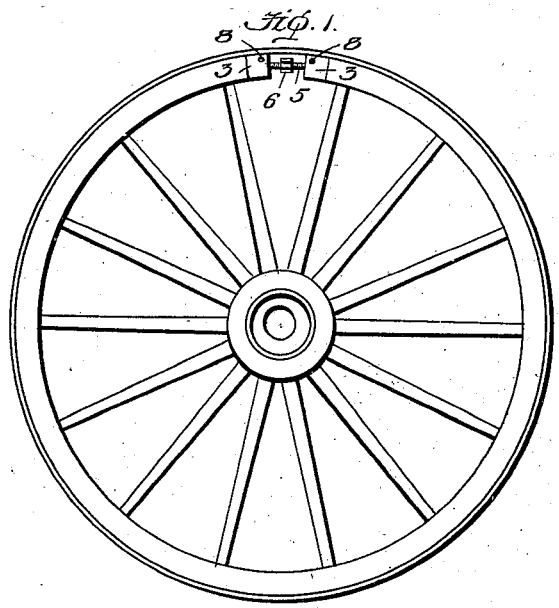
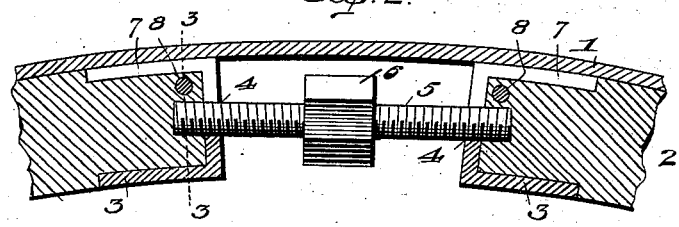
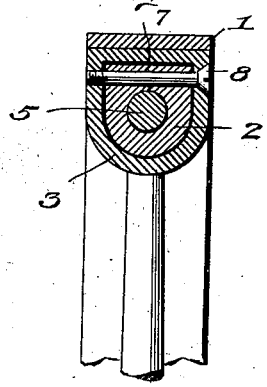
Witnesses
Inventor
Franz Heinz
By Chas. E. Riordon
Attorney

UNITED STATES PATENT OFFICE.

FRANZ HEINZ, OF GOODINTENT, KANSAS.

TIRE-TIGHTENER.

SPECIFICATION forming part of Letters Patent No. 700,490, dated May 20, 1902.

Application filed January 28, 1901. Serial No. 45,054. (No model.)

*To all whom it may concern:*

Be it known that I, FRANZ HEINZ, a citizen of the United States, residing at Goodintent, in the county of Atchison and State of Kansas, have invented certain new and useful Improvements in Tire-Tighteners; and I do declare the following to be a full, clear, and exact description of the invention, such as will enable others skilled in the art to which it appertains to make and use the same.

My invention relates to a tire-tightener. The object is to provide a simple, cheap, and effective device for expanding the felly, so as to snugly fit the tire without the necessity of cutting the tire or even removing it from the wheel.

To this end the invention consists in the construction, combination, and arrangement of the several elements of the device, as will be hereinafter more fully described, and particularly pointed out in the claim.

In the accompanying drawings the same reference characters indicate the same parts of the invention.

Figure 1 is a side elevation of a wagon-wheel, showing my improved tire-tightener in position. Fig. 2 is an enlarged section taken longitudinally through the tightening device. Fig. 3 is a transverse section of the same on the broken line 3 3 of Fig. 2.

The numeral 1 denotes the tire, and 2 the felly, the meeting ends of which are capped or encompassed by the malleable-iron sockets 3 3, the inner faces of which are provided with alined and oppositely or reversely threaded orifices 4 4 to receive the correspondingly-threaded bolt 5, which is formed with a centrally-disposed head 6, the arrangement being such that when the said bolt is turned in one direction the sockets will be brought together and when the bolt is turned in the opposite direction the sockets will be forced away from each other. Each socket is formed with a slit 7, and a clamping-bolt 8 passes transversely through each socket, so as to extend at right angles through said slit. By means of this slit 7 the sockets may be forced open, so as to be easily slipped over the ends of the felly and then made to fit snugly and tightly thereon by means of the clamp-bolts 8. The sockets may thus be used for different-sized fellies.

In using the invention a small piece is cut off of each of the meeting ends of the felly and the sockets adjusted to the meeting ends, the bolt in the meantime having been adjusted so that the inner ends of the sockets are brought as close together as possible. The tire is now shrunk on the wheel in the usual manner, and the latter is now ready for use. In the course of time when the felly shrinks and the tire becomes loose all that is necessary to do is to turn the bolt 5, so as to force the sockets, and consequently the meeting ends of the felly, apart, thereby expanding the shrunken felly and causing it to snugly fit the tire. This having been done, the clamping-bolts 8 8 are now tightened up to draw the walls of the slits together and bind the sockets firmly on the ends of the bolt, thereby preventing its working loose and allowing the felly to contract.

In the accompanying drawings I have shown my invention in the best form now known to me; but various changes in the details may be made within the skill of a good mechanic without departing from the spirit of my invention as set forth in the claim.

Having thus fully described my invention, what I claim as new and useful, and desire to secure by Letters Patent of the United States, is—

A tire-tightener comprising metal sockets to receive the meeting ends of a wood felly and an oppositely-threaded bolt the opposite ends of which are seated in correspondingly-threaded apertures in the adjacent end walls of the sockets; said sockets being split and provided with transverse clamping-bolts.

In testimony whereof I have hereunto set my hand in presence of two subscribing witnesses.

FRANZ HEINZ.

Witnesses:
CLIFFORD FRAZIER,
JOHN FLYNN.